United States Patent [19]
Sarig

[11] Patent Number: 6,161,682
[45] Date of Patent: Dec. 19, 2000

[54] CAR WASHING MACHINE AND SYSTEM

[76] Inventor: Amram Sarig, Sheshanat Hacarmel 90A, Haifa-34323, Israel

[21] Appl. No.: 09/210,996

[22] Filed: Dec. 15, 1998

[30] Foreign Application Priority Data

Jan. 6, 1998 [IL] Israel .......................................... 122864

[51] Int. Cl.[7] ........................... B65G 19/26; B65G 15/00; B65G 17/00; B61B 10/00; B61B 12/00
[52] U.S. Cl. ......................... 198/804; 198/732; 104/172.3
[58] Field of Search ..................................... 198/804, 732; 104/172.3

[56] References Cited

U.S. PATENT DOCUMENTS

| | | | |
|---|---|---|---|
| 3,408,951 | 11/1968 | Heinicke et al. | 104/172.3 |
| 3,693,392 | 9/1972 | Watson | 104/172.3 |
| 3,719,151 | 3/1973 | Anderson | 104/172.3 |
| 4,044,686 | 8/1977 | Van Brakel | 198/732 |
| 4,266,482 | 5/1981 | Barber | 104/172.3 |
| 4,576,098 | 3/1986 | Belanger et al. | 104/172.3 |
| 4,662,284 | 5/1987 | Belanger et al. | 104/172.3 |
| 5,140,910 | 8/1992 | Welter | 104/172.3 |

*Primary Examiner*—Christopher P. Ellis
*Assistant Examiner*—Gene O. Crawford
*Attorney, Agent, or Firm*—Fitzpatrick, Cella, Harper & Scinto

[57] ABSTRACT

A car washing apparatus having a continuous conveyor that moves along a conveyor path and a guide rail with an upper surface on which wheels of the vehicle roll thereby moving the vehicle from the proximal end to the distal end upon conveyor movement. The guide rail has a concave recess surface formed in the rail facing upwardly to receive and seat a vehicle wheel. A roller member, mounted to the continuous conveyor engages and drives the wheel until the wheel is driven into the recess surface. The first roller disengages the wheel while the conveyor continues to move. Subsequently, a roller member re-engages the wheel and pushes the wheel from the recess surface.

8 Claims, 5 Drawing Sheets

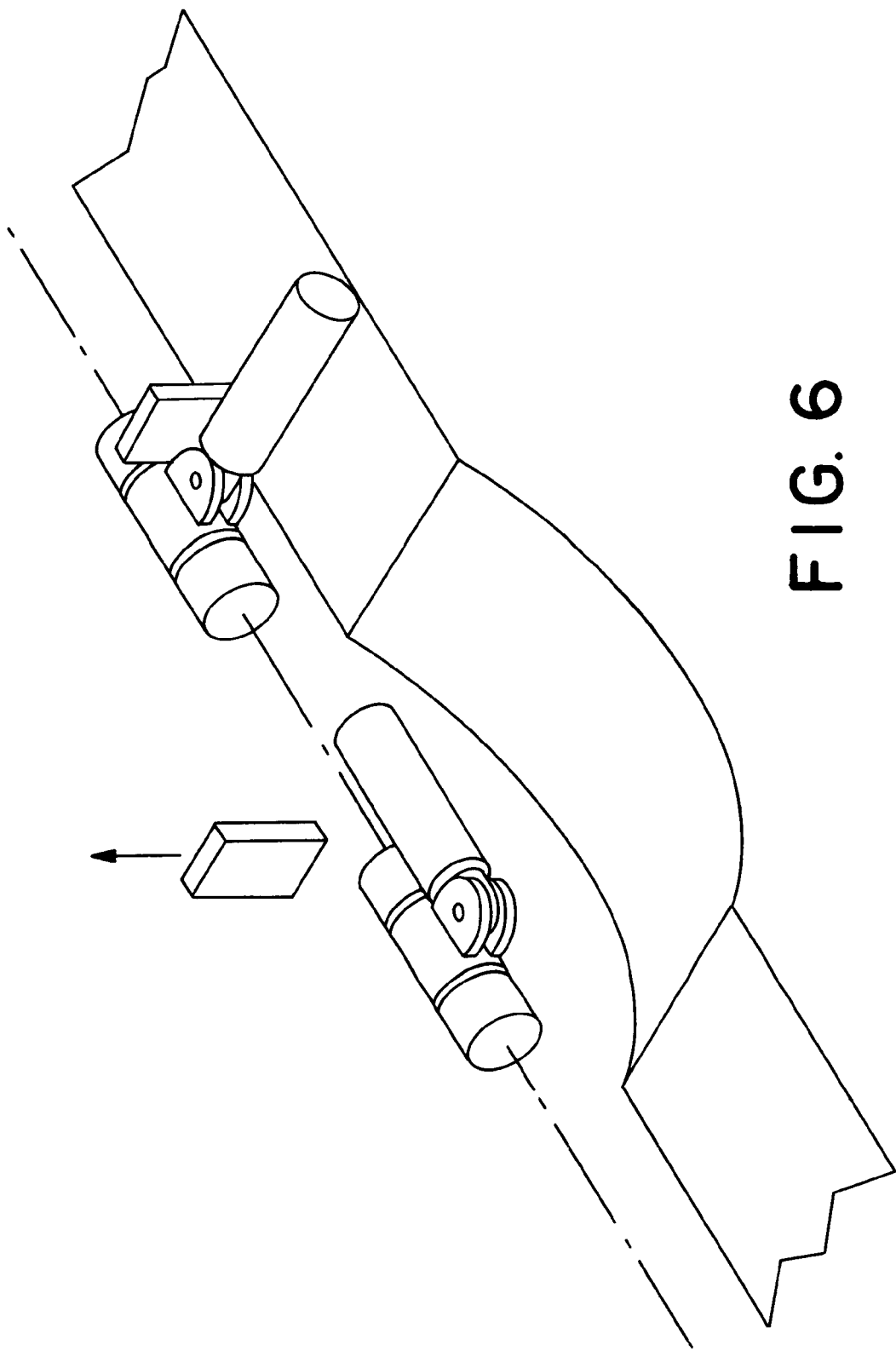

CAR WASHING MACHINE AND SYSTEM

FIELD OF THE INVENTION

The present invention relates to car washing machines and more particularly to automatic car washing machines.

BACKGROUND OF THE INVENTION

There are known two main basic automatic car washing machines, one known as "Conveyorized Car Wash" while the second is known as "Rollover".

The difference between the above mentioned machines is quite substantial, in the first type a conveyor is provided on which or, by which the car is carried or pushed forward while the cleaning brushes and drying assemblies are stationery, i.e. the washing is performed during the traveling of the car. In the second type the car is stationery while the cleaning brushes and drying assemblies move forward and backward, during the washing process.

These two concepts have some advantages and some drawbacks.

The two main drawbacks of the Conveyorized Car Wash are:

1. One set of brushes is designed so it can move across (horizontally/vertically) to the car movement direction. The purpose of this movement is to clean the front and the back parts of cars; this movement does not leave enough time for proper cleaning, and
2. The problem of crossed directions of movements applies also to wheel scrubbers. The present solutions suffer either poor cleaning quality or too much complexity which causes frequent breakdowns.

In the machines of the first kind the cleaning process is much quicker as one car after the other can enter the machine—thus such machines could wash as many as 60 cars per hour.

The machine of the second kind handles one car at a time, not in a continuous manner thus only 8 to 12 cars per hour could be washed.

Regarding the quality of washing, the machine of the second kind is by far better especially in respect of the wheels, the front and the rear parts of the car.

SUMMARY OF THE PRESENT INVENTION

As outlined above the reason for the difference of cleaning performance resides in the fact that when the car is stationary the brushes can reach all the parts including the wheels, front and the rear parts more efficiently, however while the car travels it is difficult for the brushes to follow the moving car and properly clear the wheels, the front and the rear parts of the car.

It is thus an object of the present invention to provide a car washing machine which would have speed close to the conveyor machine of the first kind and the cleaning efficiency of the second kind.

It is a further object of the present invention to provide a combined machine system where the car travels and stops to permit cleaning of the wheels, the front and the rear parts of the car.

It is thus the object to provide a conveyor type machine which would have means for stopping the car while it travels so as to enable better access to the wheels, the front and the rear parts.

The machine according to the present invention includes four (4) new elements:

1. A slot; (or recession) which enables the pushing (or pulling) wheel to slip down, consequently disengaging the car's wheel.
2. A cover; which enables the pushing wheel to go over the recession and resume the pushing of the car,
3. A concave; which fixes the car's wheel in the desired position, and
4. A shaft seat; which enables the pushing wheel to slip down. This element is applied in certain types of conveyors only.

According to the invention there is provided a combined system which comprises a conveyor washing machine which would stop the car for a predetermined span of time during the washing process to enable access to the wheels, the front and the rear parts of the car, said stop will be carried out by mechanical or electro-mechanical means adopted to disengage the car from the forward conveying means.

BRIEF DESCRIPTION OF THE DRAWINGS

The invention will now be described with reference to the annexed drawings in which:

FIG. 6 illustrates a further embodiment of the pulling system.

DETAILED DESCRIPTION OF THE PRESENT INVENTION

Figure 1:
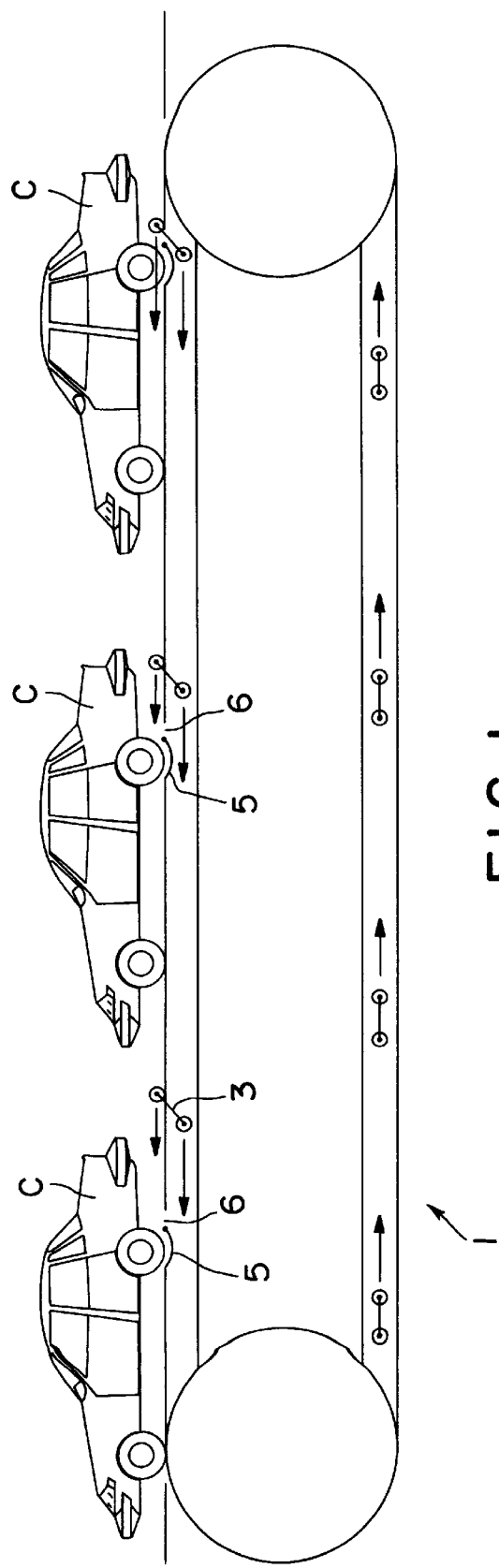
FIG. 1 is a side schematical illustration of a conveyor of such a machine.

Turning first to FIG. 1 which illustrates a conveyor assembly 1 on which travel a plurality of cars "C", the conveyor is provided with means 3 adopted to engage one of the car's wheels so as when it engages the wheel, the car is pushed/pulled forward. The conveyor will, according to the invention, be provided with a plurality of concaves to fix the car in its position, and slots 6 thus when said pushing or pulling means 3 would reach slot 6 and drop therein the engagement with the car wheel will be disconnected; the car would stop until the next pushing means will engage another wheel.

Figure 2:
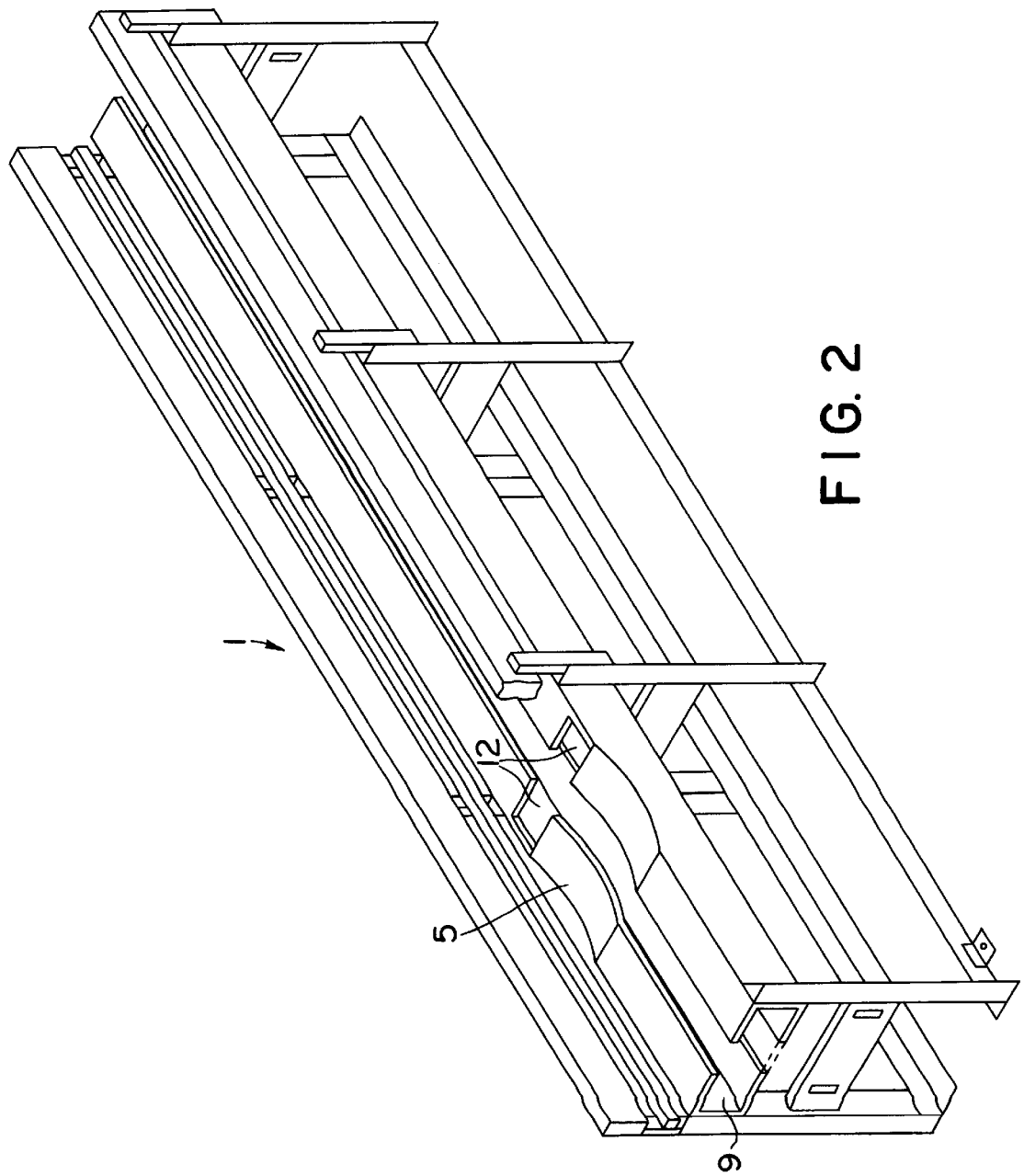
FIG. 2 is a perspective schematical illustration of the conveyor's rail.

FIG. 2 illustrates part of the structure of the conveyor and the rail 9 in which the pulling mechanism travels.

During the time span the car is stationary the wheels, the front and the rear part of the car will be cleaned by the respective brushes.

Figure 3:
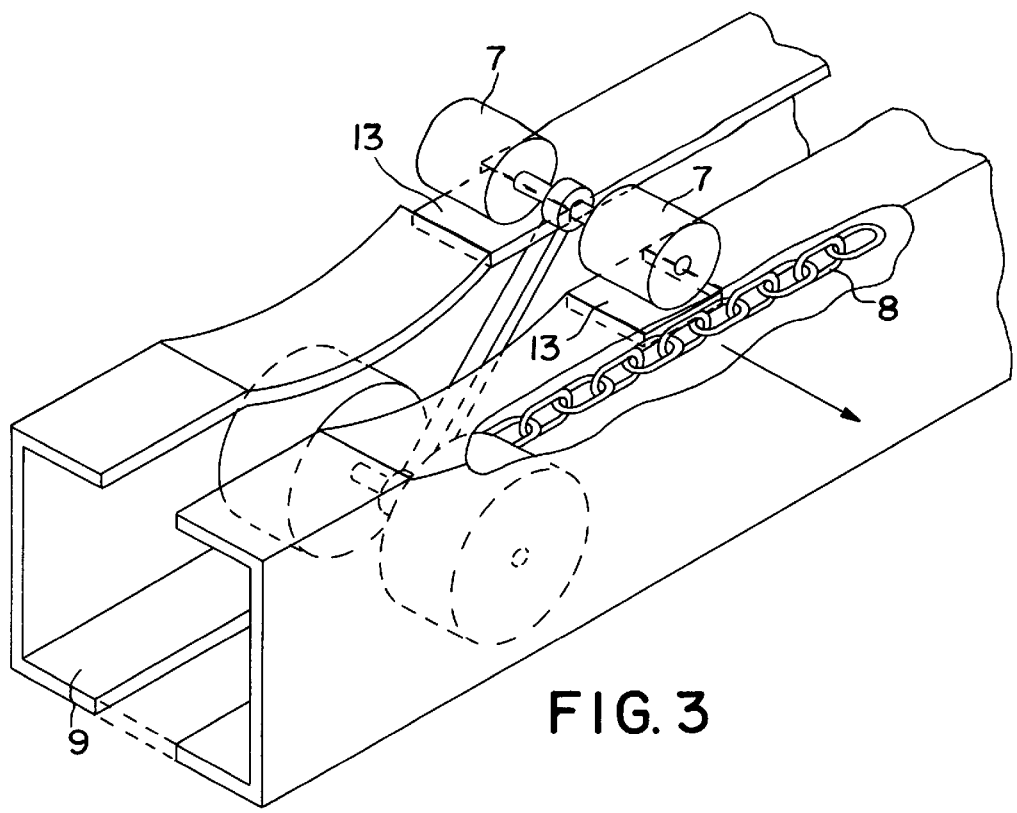
FIG. 3 illustrates an embodiment of the pulling system.

As can be seen in FIG. 3 two rollers 7 are pulled forward by chain 8 which travels within channel 9. Upper wall 10 on which rollers 7 travel is provided with opening 12, thus when rollers 7 reach opening 12 they drop into channel 9. Opening 12 is provided with cover 13. To enable the next set of rollers to pass over opening 12 cover 13 closes said opening. The operation of cover 13 and its movement is carried out by the computer of the machine.

Figure 4:
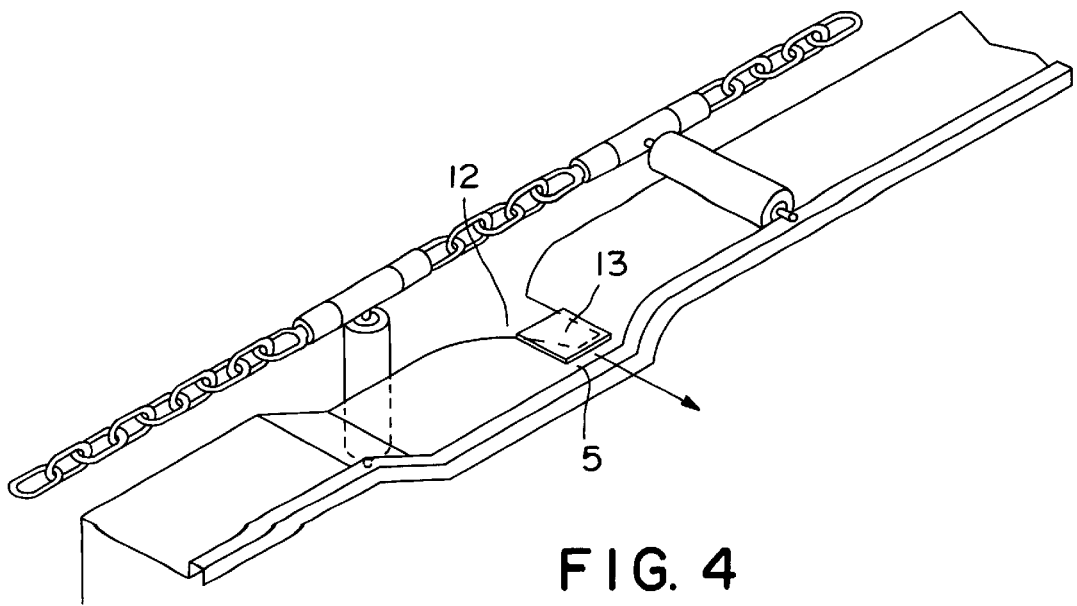
FIG. 4 illustrates a further embodiment of the pulling system.

The embodiment seen in FIG. 4 comprises a chain 8 which is provided with rollers 7. When said roller 7 reaches concave 5, and opening 12 roller 7 will drop aside and consequently disengage the cars' wheels.

Figure 5:
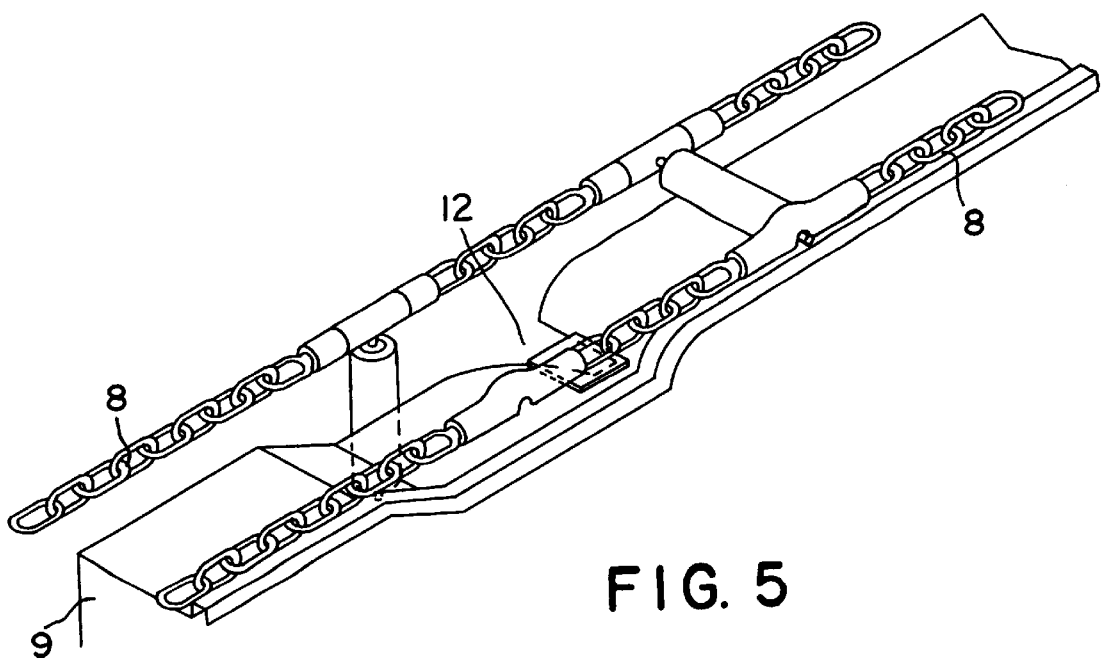
FIG. 5 illustrates a further embodiment of the pulling system.

FIG. 5 illustrates a similar arrangement where there are provided two chains 8 intermediate both chains rollers 7 are mounted, however at one side of the roller the connection is so made that the roller would drop into opening 12 to disengage the cars' wheels.

FIG. 6 further illustrate an arrangement where rollers 7 are pivotably connected at 15 to chain 8. When stopping means 16 are released by any electromechanical arrangement, roller 7 is released and pivots "backwards" which would release the car's wheels.

It is quite obvious that some of the components could be changed however, it is within the scope of the invention to operate the machine by using equivalent means and components.

I claim:

1. An apparatus, having washing elements, for washing a vehicle comprising:

a continuous conveyor that moves along a conveyor path;

one or more roller members, mounted on the continuous conveyor and positioned to engage a portion of a wheel of a vehicle to move the vehicle along the conveyor path; and at least one guide rail having a proximal end and a distal end and an upper surface on which wheels of the vehicle roll thereby moving the vehicle from the proximal end to the distal end upon conveyor movement;

said guide rail having a slot, a cover member that selectively covers the slot, and a concave recess on the upper surface, sized to accommodate said vehicle wheel;

wherein the slot is disposed proximal to the concave recess of the guide rail and sized such that the roller member enters the slot when the cover portion is not covering the slot, thereby disengaging the vehicle wheel from the roller while the conveyor continues to move; and wherein the cover member is controlled to return to a position covering the slot so that as the conveyor moves, a roller member engages the wheel of the vehicle that is in the concave recess portion.

2. The apparatus according to claim 1, wherein the roller member includes a protrusion and the continuous conveyor comprises:

two chains, one of which having a notched portion to receive the protrusion of the roller member such that when the roller member encounters an uncovered slot, the protruding portion of the roller is disengaged from the notched portion.

3. The apparatus according to claim 1, wherein the continuous conveyor is a chain.

4. The apparatus according to claim 3, wherein the roller member has a protrusion that engages an edge of the upper surface of the guide rail.

5. An apparatus, having washing elements, for washing a vehicle comprising:

a continuous conveyor that moves along a conveyor path;

at least one guide rail having a proximal end and a distal end and an upper surface on which wheels of the vehicle roll thereby moving the vehicle from the proximal end to the distal end upon conveyor movement;

said guide rail having a concave recess surface formed in the rail facing upwardly to receive and seat a vehicle wheel therein;

a first roller member, mounted to the continuous conveyor in a first position substantially transverse to the direction of movement of the conveyor, that engages and drives the wheel until the wheel is driven into the recess surface, at which time the first roller disengages the wheel by pivoting into a position substantially perpendicular to the first position while the conveyor continues to move; and a second roller member, mounted to the continuous conveyor in a position substantially transverse to the direction of movement of the conveyor, that re-engages the wheel and pushes the wheel from the recess surface.

6. The apparatus of claim 5 wherein the first and second roller members are hinged to the continuous conveyor.

7. A method for moving a vehicle along a conveyor path comprising the steps of:

pushing a vehicle on a rail by engaging a wheel of a vehicle with a first roller member mounted to a continuous conveyor;

disengaging the first roller member from the wheel when the wheel encounters a concave recess formed in the rail; and pushing the vehicle out of the recess by reengaging the wheel with a second roller member mounted to the continuous conveyor.

8. The method of claim 7, further comprising:

exposing a slot, into which the first roller member drops, thereby disengaging the wheel; and covering the slot to enable the second roller member to re-engage the wheel.

* * * * *